(12) United States Patent
Hirota et al.

(10) Patent No.: US 11,009,067 B2
(45) Date of Patent: May 18, 2021

(54) MOUNTING STRUCTURE OF BEARING MEMBER AND SPEED REDUCING APPARATUS

(71) Applicant: THK CO., LTD., Tokyo (JP)

(72) Inventors: Jun Hirota, Tokyo (JP); Junichi Iguchi, Tokyo (JP); Hajime Fukushima, Tokyo (JP)

(73) Assignee: THK CO., LTD., Tokyo (JP)

( * ) Notice: Subject to any disclaimer, the term of this patent is extended or adjusted under 35 U.S.C. 154(b) by 29 days.

(21) Appl. No.: 16/485,304

(22) PCT Filed: Feb. 19, 2018

(86) PCT No.: PCT/JP2018/005725
§ 371 (c)(1),
(2) Date: Aug. 12, 2019

(87) PCT Pub. No.: WO2018/155376
PCT Pub. Date: Aug. 30, 2018

(65) Prior Publication Data
US 2020/0003255 A1    Jan. 2, 2020

(30) Foreign Application Priority Data

Feb. 24, 2017    (JP) .............................. JP2017-032969

(51) Int. Cl.
*F16H 1/16*    (2006.01)
*F16H 1/20*    (2006.01)
(Continued)

(52) U.S. Cl.
CPC ............ *F16C 19/36* (2013.01); *F16C 35/063* (2013.01); *F16H 1/16* (2013.01); *F16H 57/039* (2013.01)

(58) Field of Classification Search
CPC ...... F16C 35/067; F16C 35/077; F16C 19/36; F16C 35/063; F16H 57/039; F16H 2048/423; F16H 57/021
See application file for complete search history.

(56) References Cited

U.S. PATENT DOCUMENTS 3,187,591 A * 6/1965 Johnson .................... B06B 1/16
 74/86
4,824,264 A * 4/1989 Hoebel ................. F16C 19/386
 384/473

(Continued)

FOREIGN PATENT DOCUMENTS

CN      101443986 A    5/2009
JP      62-37658 U     3/1987
(Continued)

OTHER PUBLICATIONS

Office Action dated Feb. 17, 2020, issued in counterpart CN Application No. 201880013771.0, with English Translation (12 pages).

(Continued)

*Primary Examiner* — Jake Cook
(74) *Attorney, Agent, or Firm* — Westerman, Hattori, Daniels & Adrian, LLP

(57) ABSTRACT

An object is to provide a mounting structure of a bearing member which enables size and weight reduction of entire apparatus and also contributes to cost reduction thereof. The mounting structure of a bearing member includes: a bearing member for supporting a rotary shaft; a case member to which the bearing member is mounted; and a mounting plate for clamping the bearing member in an axial direction of the rotary shaft in conjunction with the case member, wherein the mounting plate includes a mounting portion of a counter member which is mounted to the case member and clamps (Continued)

the case member in the axial direction in conjunction with the counter member.

6 Claims, 5 Drawing Sheets

(51) Int. Cl.
    *F16C 19/36*     (2006.01)
    *F16C 35/063*     (2006.01)
    *F16H 57/039*     (2012.01)

(56) References Cited

U.S. PATENT DOCUMENTS

| | | | | |
|---|---|---|---|---|
| 5,411,337 A | * | 5/1995 | Bianco | B21B 31/07 384/519 |
| 2014/0169719 A1 | | 6/2014 | Seufert et al. | |
| 2015/0298725 A1 | | 10/2015 | Kichikawa et al. | |
| 2016/0258487 A1 | | 9/2016 | Barthelme et al. | |
| 2016/0273661 A1 | * | 9/2016 | Ihana | F16C 35/077 |
| 2019/0009693 A1 | * | 1/2019 | Angerer | F16H 57/039 |

FOREIGN PATENT DOCUMENTS

| | | |
|---|---|---|
| JP | 5-18490 Y2 | 5/1993 |
| JP | 2000-170780 A | 6/2000 |
| JP | 2001-213334 A | 8/2001 |
| JP | 2006-57678 A | 3/2006 |
| WO | 2014/077006 A1 | 5/2014 |

OTHER PUBLICATIONS

International Search Report dated Apr. 10, 2018, issued in counterpart International Application No. PCT/JP2018/005725 (2 pages).
Decision to Grant a Patent dated Sep. 4, 2018, issued in counterpart of Japanese Patent Application No. 2017-032969 with English Translation (5 pages).
Notification of Reasons for Refusal dated Jun. 12, 2018, issued in counterpart of Japanese Patent Application No. 2017-032969 with English Translation (10 pages).

* cited by examiner

MOUNTING STRUCTURE OF BEARING MEMBER AND SPEED REDUCING APPARATUS

TECHNICAL FIELD

The present invention relates to a mounting structure of a bearing member and a speed reducing apparatus including this mounting structure, and particularly to a mounting structure of a bearing member and a speed reducing apparatus which enable size and weight reduction as well as cost reduction of the entire apparatus.

BACKGROUND ART

Conventionally, as a method for mounting a bearing member that supports a rotating rotary shaft to a case member, etc., there are known, besides a method in which a bearing member is press fitted into a mounting portion, and a method in which a bearing member is formed with a mounting hole, etc. and is fastened to a case member etc., various methods such as a mounting structure in which an outer ring and an inner ring of a bearing member are grasped respectively by a cramp to be fixed as described in Patent Literature 1 to be shown below.

CITATION LIST

Patent Literature

Patent Literature 1: Japanese Examined Utility Model Application Publication No. H5-18490

DISCLOSURE OF THE INVENTION

Problems to be Solved by the Invention

However, in a mounting structure of a bearing member as described in Patent Literature 1, since a fastening bolt is fastened to a housing, the housing itself is required to have predetermined strength to ensure fastening strength of the fastening bolt, making size and weight reduction of the housing difficult to achieve.

Moreover, although a structure is conceivable in which a fastening hole is formed in a bearing member and the bearing member is directly mounted to a case member, in this case, the cost of the bearing member itself will increase and the strength of the case member is required as well. Therefore, even if such a configuration is adopted, it is still difficult to achieve size and weight reduction of the entire apparatus.

The present invention has been made to solve the above described cases, and has its object to provide a mounting structure of a bearing member which enables size and weight reduction of the entire apparatus and also contributes to cost reduction thereof, and a speed reducing apparatus having the mounting structure.

Means for Solving the Problems

A mounting structure of a bearing member according to the present invention includes: a bearing member for supporting a rotary shaft; a case member to which the bearing member is mounted; and a mounting plate for clamping the bearing member in an axial direction of the rotary shaft in conjunction with the case member, wherein the mounting plate includes a mounting portion of a counter member which is mounted to the case member, and clamps the case member in the axial direction in conjunction with the counter member.

Moreover, a speed reducing apparatus according to the present invention includes: a bearing member for supporting a rotary shaft via a table member; a case member to which the bearing member is mounted, wherein the case member includes a worm shaft rotatably mounted to the case member and a worm gear which meshes with the worm shaft, and the rotary shaft rotates as the worm gear rotates; and a mounting plate for clamping the bearing member in the axial direction of the rotary shaft in conjunction with the case member, wherein the mounting plate includes a mounting portion of a counter member which is mounted to the case member, and clamps the case member in the axial direction in conjunction with the counter member.

Effects of the Invention

According to the present invention, since a mounting plate to which a bearing member is mounted is provided with a mounting portion of a counter member, it is possible to securely mount the bearing member by the mounting plate regardless of which type of material the case member is made of, thereby at the same time, achieving size and weight reduction of the case member, as well as realizing cost reduction of the entire apparatus.

MODE FOR CARRYING OUT THE INVENTION

Hereinafter, an embodiment of a speed reducing apparatus provided with a mounting structure of a bearing member according to the present invention will be described with reference to the drawings. Note that the following embodiments are not intended to limit the invention according to each claim, and all the combinations of features described in the embodiments are not necessarily essential to the solution means of the invention.

Figure 1:
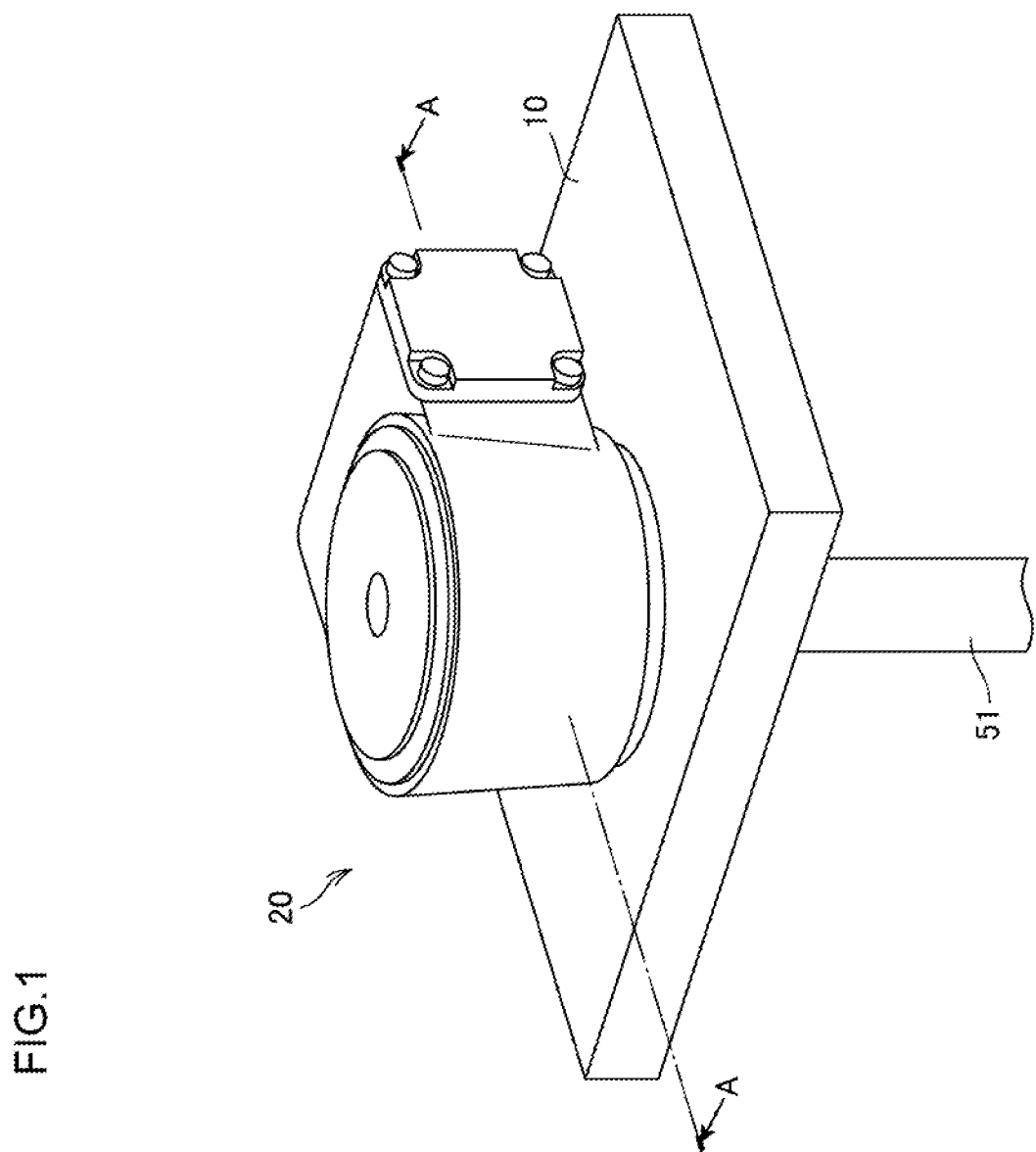
FIG. 1 is a perspective view of a speed reducing apparatus according to an embodiment of the present invention.
Figure 2:
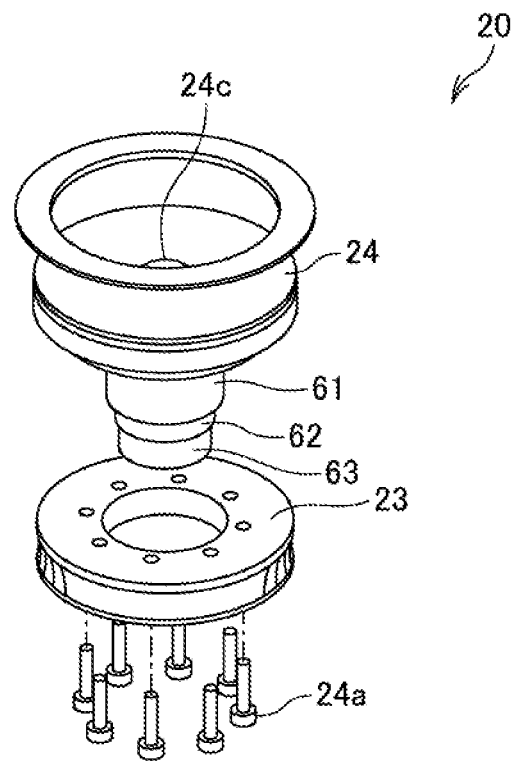
FIG. 2 is an exploded view of a speed reducing apparatus according to an embodiment of the present invention.
Figure 2:
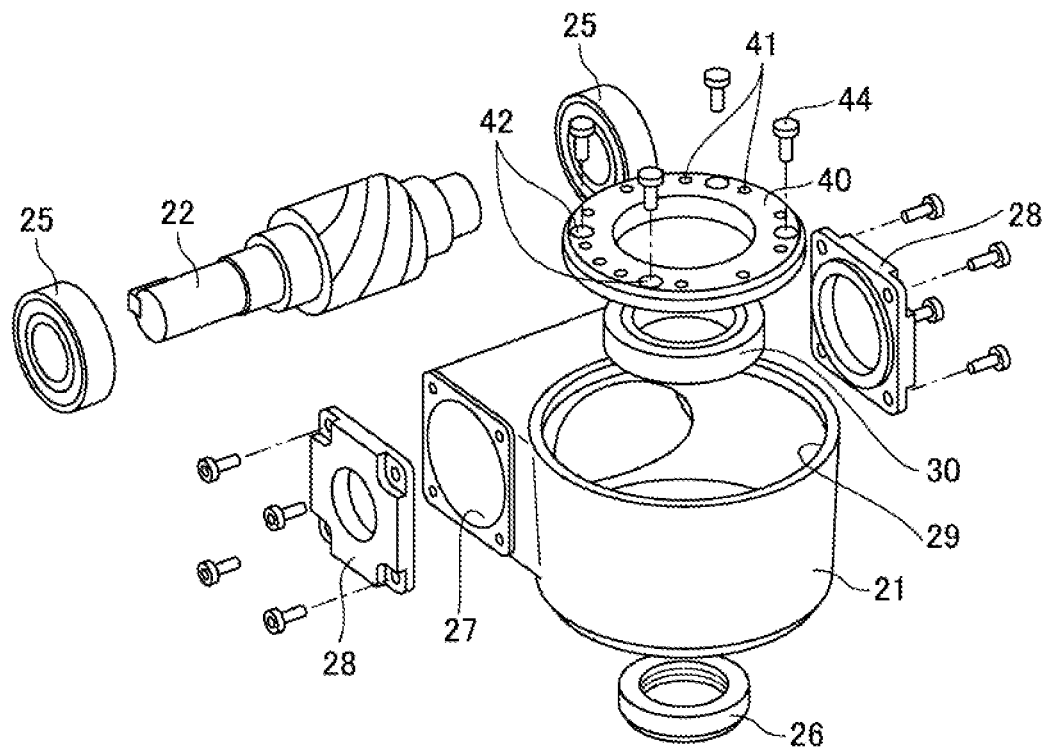
Figure 3:
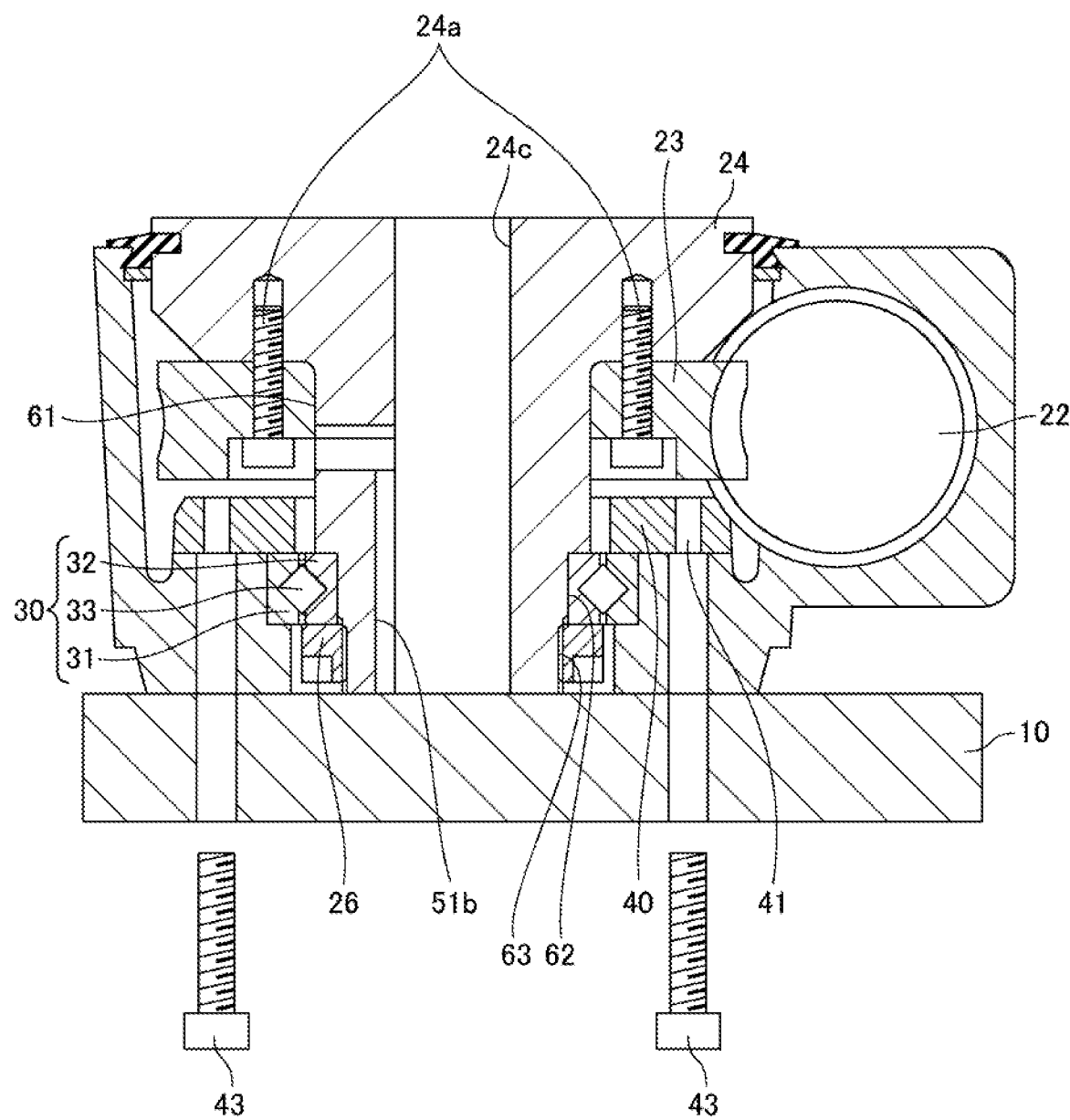
FIG. 3 is an A-A cross-sectional view in FIG. 1.
Figure 4:
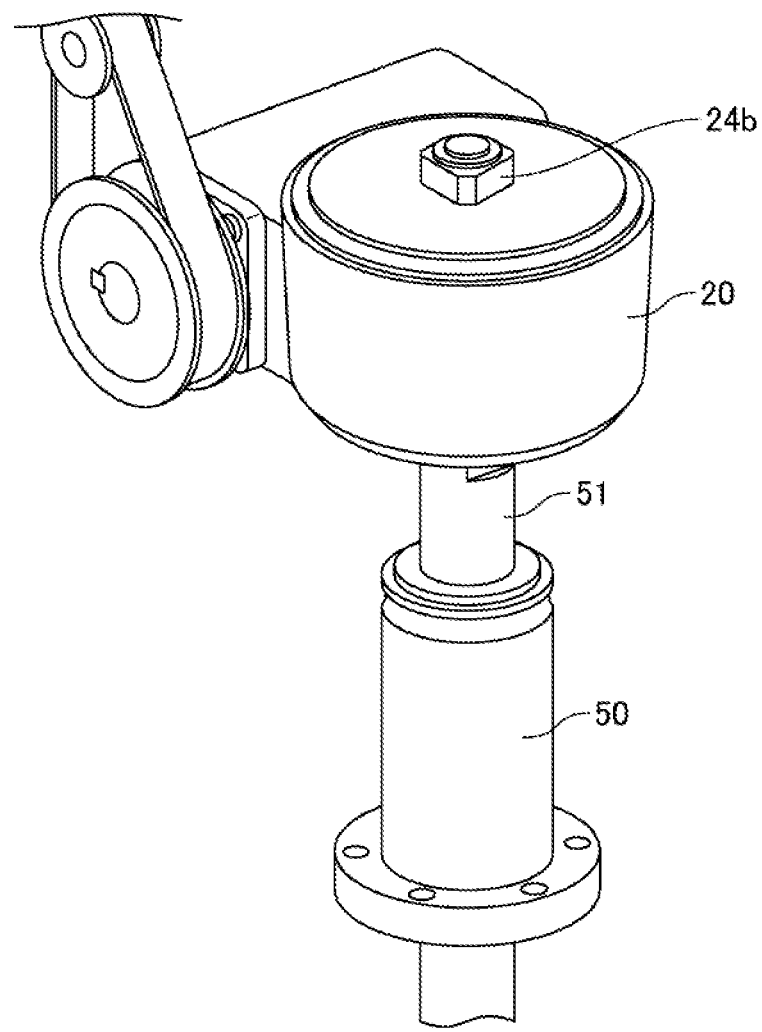
FIG. 4 is a perspective view of a speed reducing apparatus according to an embodiment of the present invention showing a state in which a ball screw device is mounted.
Figure 5:
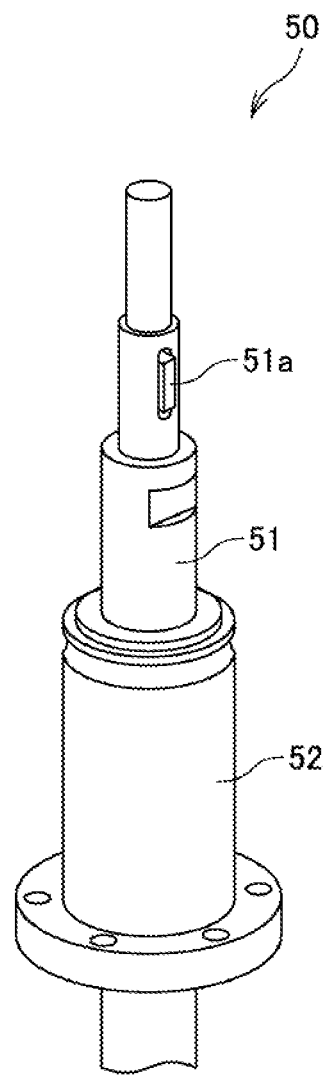
FIG. 5 is a perspective view of a ball screw device.

FIG. 1 is a perspective view of a speed reducing apparatus according to an embodiment of the present invention; FIG. 2 is an exploded view of a speed reducing apparatus according to an embodiment of the present invention; FIG. 3 is an A-A cross-sectional view in FIG. 1; FIG. 4 is a perspective view of a speed reducing apparatus according an embodiment of the present invention showing a state in which a ball screw device is mounted; and FIG. 5 is a perspective view of a ball screw device.

As shown in FIG. 1, the speed reducing apparatus 20 according to the present embodiment constitutes a so-called through-drive type speed reducing apparatus that rotates an input shaft by an input from a drive source and transfers the rotation to the rotary shaft 51. The speed reducing apparatus 20 according to the present embodiment is mounted and fixed to, for example, a counter member 10.

As shown in FIG. 2, the speed reducing apparatus 20 according to the present embodiment includes a worm shaft 22 for inputting rotational force from a drive source such as an electric motor (not shown) and a worm gear 23 in which a tooth portion meshing with the worm shaft 22 is formed on the outer periphery thereof, and these members are contained in a containing part 29 of the case member 21. Using a lightweight material such as an aluminum alloy for the case member 21 enables size and weight reduction of the speed reducing apparatus 20, which is preferable.

The worm shaft 22 is a member in which a helical tooth portion is formed on its outer periphery, and is rotatably inserted into the worm shaft hole 27 of the case member 21. Both ends of the worm shaft 22 are rotatably supported by the worm-shaft bearing members 25 and 25, and are held by closing plates 28 and 28 so as not to come off from the case member 21.

The worm gear 23 has a table member 24 mounted at its center, and the worm gear 23 and the table member 24 are rotatably supported by a bearing member 30 mounted to the case member 21 by a mounting plate 40 and a holding plate 26. Note that the mounting plate 40 is preferably made of, for example, a material, such as iron or steel, having higher material strength than that of the material used for the above-described case member 21.

The table member 24 is formed with a worm-gear mounting portion 61 to be inserted into a center hole of the worm gear 23; a bearing-member mounting portion 62 which is formed to have a smaller diameter than the worm-gear mounting portion 61; and a holding-plate mounting portion 63 which is formed to have a smaller diameter than the bearing-member mounting portion 62 and is formed with a thread groove on its outer periphery. The table member 24 is fastened with the worm gear 23 assembled to the worm-gear mounting portion 61 by table fastening bolts 24a. Further, the table member 24 is formed with a rotary-shaft through hole 24c through which the rotary shaft 51 is inserted. In this way, the rotary-shaft through hole 24c for inserting the rotary shaft is formed in the table member 24 so that the bearing member 30 mounted to the bearing-member mounting portion 62 rotatably supports the rotary shaft 51.

As shown in FIG. 3, the bearing member 30 has a plurality of cylindrical rolling elements 33 interposed between a V-shaped roller rolling section formed in an outer ring 31 and a V-shaped roller rolling section formed in an inner ring 32, and rotary shafts of adjacent rolling elements 33 are arranged to be orthogonal to each other, thus constituting a so-called cross roller bearing. By using the cross roller bearing, the bearing member 30 can bear loads in various directions such as a radial load, an axial load, and a moment load by a single bearing member.

Next, the mounting structure of the bearing member 30 in the speed reducing apparatus 20 according to the present embodiment will be described. First the bearing member 30 is inserted into the case member 21, and the outer ring 31 of the bearing member 30 is fixed in the axial direction by the mounting plate 40. Further, a table member 24 mounted with a worm gear 23 is inserted into the bearing member 30, and the inner ring 32 of the bearing member 30 is assembled to the bearing-member mounting portion 62 of the table member 24, thereafter the holding plate 26 is fastened to a thread groove formed on the holding-plate mounting portion 63 so that the inner ring 32 is clamped by a step between the bearing-member mounting portion 62 and the worm-gear mounting portion 61, and the holding plate 26, thereby being fixed.

Next, the outer ring 31 of the bearing member 30 is fixed together with the case member 21 by being clamped and fixed in the axial direction of the rotary shaft by the mounting plate 40 and the counter member 10. More specifically, as shown in FIG. 2, the mounting plate 40 mounts the bearing member 30 to the case member 21 by fixing it to the case member 21 by a temporary fastening bolt 44 via a second mounting portion 42. Note that this temporary fastening bolt 44 is fastened for positioning of the mounting portion 41 of a holding plate 40 to facilitate the assembling of a mounting-plate fastening bolt 43 during mounting work between the counter member 10 to be described below and the speed reducing apparatus 20, and the temporary fastening bolt 44 may not be used provided that positioning of the mounting portion 41 can be performed.

Then, as shown in FIG. 3, when mounting the speed reducing apparatus 20 to the counter member 10, mounting between the counter member 10 and the speed reducing apparatus 20 is performed by a mounting-plate fastening bolt 43. At this time, the mounting-plate fastening bolt 43 is configured to be screwed into the mounting portion 41 formed on the mounting plate 40. Further, since the mounting plate 40 is made of a material having a material strength higher than that of the case member 21, even if a lightweight aluminum alloy or the like is used for case member 21 to achieve weight reduction thereof, assembling strength with the counter member 10 can be secured.

In this way, according to the mounting structure of the bearing member 30 of the speed reducing apparatus 20 according to the present embodiment, since the mounting plate 40 performs fixing of the bearing member 30, and at the same time, mounting with the counter member 10, the case member 21 can be made of lightweight material, thus enabling size and weight reduction of the entire apparatus. Further, since the bearing member 30 which has been conventionally utilized can be used without modification, without forming a fastening hole or the like for mounting in the bearing member 30 itself, this configuration contributes to cost reduction as well.

Further, according to the mounting structure of the bearing member 30 of the speed reducing apparatus 20 according to the present embodiment, since the mounting structure can bear loads in various directions, such as a radial load, an axial load and a moment load of the rotary shaft 51, there is no need of providing a plurality of bearing members 30 corresponding to the various loads of the bearing member 30, thus enabling size and weight reduction of the speed reducing apparatus 20.

As shown in FIG. 4, the rotary shaft 51 is inserted into a rotary-shaft through hole 24c of the table member 24, and thereafter a shaft end of the rotary shaft 51 is fixed by a rotary-shaft fastening nut 24b. Note that, the speed reducing apparatus 20 according to the present embodiment uses a screw shaft of a ball screw device 50 as the rotary shaft 51. Since, in this way, a shaft end of the rotary shaft 51 is fixed to the table member 24 to which the bearing member 30 is mounted, it is possible to obviate the need of axis alignment between the rotary shaft 51 and the bearing member 30, thus facilitating assembly and contributing to cost reduction of the speed reducing apparatus 20.

As shown in FIG. 5, the ball screw device 50 includes: a screw shaft as the rotary shaft 51, which is formed with a screw-shaped rolling-element rolling groove not shown and with a predetermined lead on an outer peripheral surface, and which is formed to extend along an axial direction; and a nut member 52 which includes a through hole through which the rotary shaft 51 passes and is formed into a cylindrical shape, and in which a loaded rolling-element rolling groove, which is opposed to a rolling-element rolling groove formed on the rotary shaft 51, is formed in an inner peripheral surface of the through hole, wherein the rotary shaft 51 is screwed into the nut member 52 with a plurality of rolling elements not shown arranged between the rolling-element rolling groove and the loaded rolling-element rolling groove.

Thus configured ball screw device 50 is configured such that the nut member 52 screwed to the rotary shaft 51 moves along the axial direction of the rotary shaft 51 as a result of rotation of the rotary shaft 51. Since, in the speed reducing apparatus 20 according to the present embodiment, the rotary shaft 51 is rotated by input force from a driving source, it can be used, for example, as an actuator for lift driving the nut member 52.

Note that a key portion 51*a* is formed at a site, which is inserted into the table member 24, of the rotary shaft 51. As shown in FIG. 3, the key portion 51*a* is fixed by being engaged with a key groove 51*b* formed in the inner peripheral surface of the rotary-shaft through hole 24*c* so that the rotary shaft 51 does not axially rotate relative to the table member 24.

Note that the present invention will not be limited to the above described embodiments, and various modification thereof is possible within a range not changing the spirit of the present invention. For example, in the speed reducing apparatus 20 according to the present embodiment, although description has been made on a case in which the case member 21 is made of an aluminum alloy, the case member 21 may be formed of synthetic resin, or the like.

Moreover, description also has been made on a case in which a screw shaft of a ball screw device 50 is used for the rotary shaft 51, the rotary shaft will not be limited to this, and any rotary shaft may be used. Further, although the speed reducing apparatus according to the present embodiment has a structure in which transfer of rotation from a worm gear 23 to a worm shaft 22 is difficult since the worm shaft 22 and the worm gear 23 are meshed with each other, a reverse-input preventing mechanism for preventing reverse input from the worm gear 23 may be provided. It is obvious from the claims that embodiments in which such a modification or improvement is added is also included in the technical scope of the present invention.

| REFERENCE NUMERALS | | |
|---|---|---|
| 10 Counter member, | 21 Case member, | 22 Warm shaft, |
| 23 Warm gear, | 24 Table member, | 26 Holding plate, |
| 30 Bearing member, | 31 Outer ring, | 32 Inner ring, |
| 40 Mounting plate, | 41 Mounting portion, | 51 Rotary shaft. |

The invention claimed is:

1. A mounting structure of a bearing member comprising:
the bearing member for supporting a rotary shaft;
a case member to which the bearing member is mounted, wherein
the case member includes a worm shaft rotatably mounted to the case member and a worm gear which meshes with the worm shaft, and
the rotary shaft rotates as the worm gear rotates; and
a mounting plate for clamping the bearing member in an axial direction of the rotary shaft in conjunction with the case member, wherein
the mounting plate includes a mounting portion of a counter member which is mounted to the case member, and clamps the case member in the axial direction in conjunction with the counter member.

2. The mounting structure of a bearing member according to claim 1, wherein
a material strength of the mounting plate is higher than a tensile strength of the case member.

3. The mounting structure of a bearing member according to claim 1, wherein
a shaft end of the rotary shaft is inserted into and fixed to a table member to which the worm gear is mounted.

4. The mounting structure of a bearing member according to claim 3, wherein
an outer ring of the bearing member is clamped by the mounting plate and the case member, and
an inner ring of the bearing member is clamped by the table member and a holding plate fastened to the table member.

5. A speed reducing apparatus, comprising:
a bearing member for supporting a rotary shaft via a table member;
a case member to which the bearing member is mounted, wherein the case member includes a worm shaft rotatably mounted to the case member and a worm gear which meshes with the worm shaft, and the rotary shaft rotates as the worm gear rotates; and
a mounting plate for clamping the bearing member in the axial direction of the rotary shaft in conjunction with the case member, wherein
the mounting plate includes a mounting portion of a counter member which is mounted to the case member, and clamps the case member in the axial direction in conjunction with the counter member.

6. The mounting structure of a bearing member according to claim 2, wherein
a shaft end of the rotary shaft is inserted into and fixed to a table member to which the worm gear is mounted.

* * * * *